US010191357B2

(12) United States Patent
DeMers et al.

(10) Patent No.: US 10,191,357 B2
(45) Date of Patent: Jan. 29, 2019

(54) TRAIL CAMERA MOUNTING SYSTEM

(71) Applicant: Spy High LLC, Great Falls, MT (US)

(72) Inventors: Michael S. DeMers, Great Falls, MT (US); Simon Evans, Great Falls, MT (US)

( * ) Notice: Subject to any disclaimer, the term of this patent is extended or adjusted under 35 U.S.C. 154(b) by 0 days.

(21) Appl. No.: 15/262,610

(22) Filed: Sep. 12, 2016

(65) Prior Publication Data

US 2017/0075197 A1    Mar. 16, 2017

Related U.S. Application Data

(60) Provisional application No. 62/332,910, filed on May 6, 2016, provisional application No. 62/217,653, filed on Sep. 11, 2015.

(51) Int. Cl.
*G03B 17/56* (2006.01)
*F16M 11/06* (2006.01)
*F16M 13/02* (2006.01)

(52) U.S. Cl.
CPC ............ *G03B 17/561* (2013.01); *F16M 11/06* (2013.01); *F16M 13/02* (2013.01)

(58) Field of Classification Search
CPC ....... G03B 17/561; F16M 11/06; F16M 13/02
See application file for complete search history.

(56) References Cited

U.S. PATENT DOCUMENTS

| 2,703,928 A | 3/1955 | Southwick |
| 2,986,054 A | 5/1961 | Lurie |
| 3,731,380 A | 5/1973 | Mathiesen |
| 4,607,974 A | 8/1986 | Brothers et al. |
| 5,228,202 A | 7/1993 | Liao |
| 5,288,161 A | 2/1994 | Graves et al. |
| 5,626,322 A | 5/1997 | Braun |
| 5,669,592 A | 9/1997 | Kearful |
| 5,787,590 A | 8/1998 | D'Alessandro, Sr. |
| 7,721,391 B2 | 5/2010 | Bukovitz et al. |
| 7,975,973 B1 | 7/2011 | Weeden |
| 8,109,680 B2 * | 2/2012 | Olien ............... F16M 11/041 396/428 |
| 8,875,350 B2 | 11/2014 | Bukovitz |
| 9,027,895 B2 * | 5/2015 | Hunter ............... G01C 15/06 248/125.8 |
| 9,423,673 B2 * | 8/2016 | Clearman ........... G03B 17/561 |

(Continued)

FOREIGN PATENT DOCUMENTS

GB    2 445 173 A    7/2008

*Primary Examiner* — Clayton E. LaBalle
*Assistant Examiner* — Dennis Hancock
(74) *Attorney, Agent, or Firm* — Haffey Vap PLLC; Mitchell J.W. Vap

(57) ABSTRACT

A two-piece mounting system for a trail camera has a support with a fitting that is placed high in a tree on a tree branch. The support with an auger anchor is driven into the tree branch with an extension pole equipped with a companion fitting. The auger has a releasable spring-loaded turn-to-lock capture means to capture and hold a utility bar. The utility bar, like the auger support, is placed and attached to the support with the extension pole. The utility bar receives a universal camera mount attached to the bar through a swivel. The camera mount and swivel have an adjustment bar that has a fitting that can be received by the extension pole fitting, so once placed in the tree, the camera angle can be adjusted.

24 Claims, 13 Drawing Sheets

(56) References Cited

U.S. PATENT DOCUMENTS

| | | |
|---|---|---|
| 2003/0133708 A1 | 7/2003 | Tatera |
| 2008/0099655 A1 | 5/2008 | Goodman |
| 2011/0116782 A1 | 5/2011 | Scott |
| 2011/0222842 A1* | 9/2011 | Schippers .............. F16M 11/10 396/428 |
| 2015/0316459 A1* | 11/2015 | Volz ........................ G01N 3/42 73/82 |
| 2017/0345536 A1* | 11/2017 | Breiwa .................. H01F 38/14 |

* cited by examiner

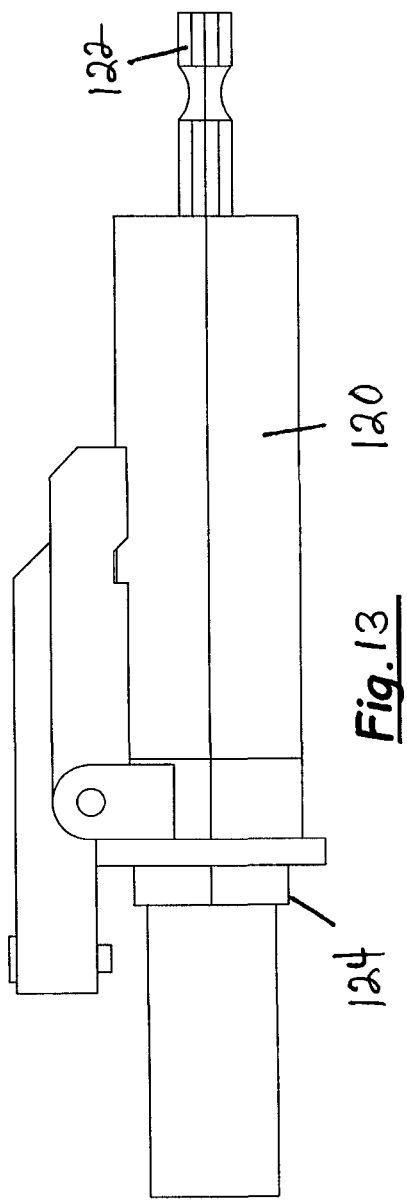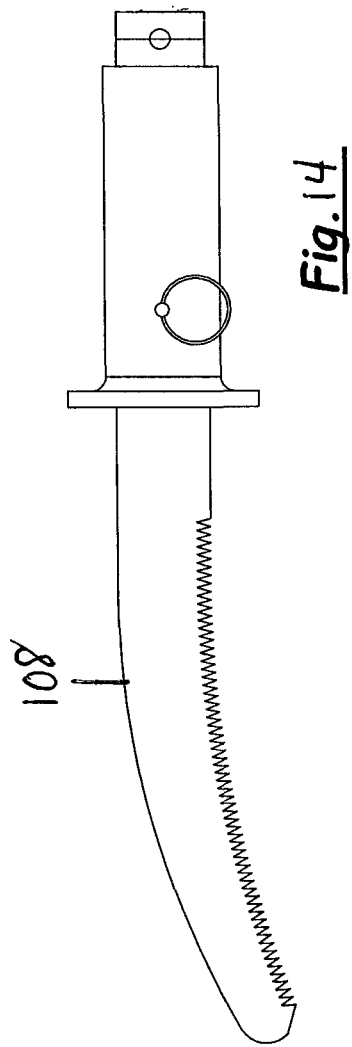

TRAIL CAMERA MOUNTING SYSTEM

CROSS-REFERENCE TO RELATED APPLICATIONS

This application claims the benefits of U.S. Provisional Application No. 62/217,653, filed Sep. 11, 2015, and U.S. Provisional Application No. 62/332,910, filed May 6, 2016, the disclosures of which are hereby incorporated by reference in their entirety including all figures, tables, and drawings.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

Trail cameras expose the secrets of the wilderness to a curious man-kind. Hunters use trail cameras to identify game trails and wallows used by potential prey. Wildlife Biologists use trail cameras to track migration patterns and understand species population. Game Wardens use trail cameras to prevent poaching and the destruction of public land. Land owners use cameras for property surveillance and home security. Much of this information is often lost however because trail cameras are frequently stolen. Most trail cameras are placed at game height and are thus easily accessible. Placing a camera mount higher in a tree, out of reach, requires carrying a ladder deep into the woods and then making multiple trips up and down the ladder to aim the camera on the trail. Alternatively, one can shimmy up the tree while trying to carry and then position the delicate camera equipment. A number of trail camera mounting systems have been described (see, for example, U.S. Pat. Nos. 5,626,322; 5,669,592; and 7,975,973 B1, and U.S. Patent Application Publication Nos. 2003/0133708; 2008/0099655; and 2011/0116782, and UK Patent Application GB 2 445 173). Some of these systems have addressed the issue of theft yet none have described a system that can be installed and manipulated remotely. Extension rods and poles have been described to allow someone to extend a tool's reach and perhaps remotely trim a high tree branch (see, for example, U.S. Pat. Nos. 2,703,928; 2,986,054; 3,731,380; 4,607,974; 5,228,202; 5,288,161; 5,787,590; 7,721,391 B2; and 8,875,350 B2) but none have described placing and manipulating a tool or camera remotely.

A need remains for a trail camera mounting system that can be installed high into a tree without leaving the ground. The system should be easy to operate yet hold the equipment securely in the tree. Conveniently, the system would allow for separate removal of the camera for maintenance.

All patents, patent applications, provisional patent applications and publications referred to or cited herein, are incorporated by reference in their entirety to the extent they are not inconsistent with the teachings of the specification.

BRIEF SUMMARY OF THE INVENTION

The invention is a two-piece mounting system that can be manipulated high in a tree by an extension pole. A support attached to the tree connects to a utility bar which holds the camera. Each piece has a fitting that corresponds to a fitting on the extension pole that allows the pieces to be manipulated by the pole. A universal camera mount can be added to the utility bar to mount a trail camera. The universal camera mount is preferably mounted on a swivel so that an adjustment bar connected to the camera mount can be used to adjust the camera when mounted in the tree. The adjustment bar has a fitting that corresponds to the fitting on the extension pole.

In one embodiment, the support includes an auger that bores into a tree. The auger can be placed and turned to bore into the tree by the extension pole. Thus, the support is placed in the tree without having to climb into the tree. In another embodiment, the support includes a clamp that can be tightened around a tree branch. The clamp, like the auger, is placed in the tree without having to climb the tree. The jaws of the clamp are tightened around the tree branch from the ground by the extension pole. Another embodiment of the support of the mounting system of the subject invention includes a mounting plate. The plate can be attached to the side of a building. Although it is necessary to climb to attach the plate to a structure, the camera can be mounted to the plate, manipulated on the plate, and removed from the plate for maintenance by the extension pole without leaving the ground.

In other embodiments, lights or motion detecting lamps can also be mounted to the utility bar to illuminate camp or detect camp intruders. An aperture in an end of the utility bar receives a block and tackle that can be used to hoist loads from the ground. The hoist is useful for storing food away from bears or hanging game for processing.

BRIEF DESCRIPTION OF THE SEVERAL VIEWS OF THE DRAWING

FIG. 13 is side elevational view of a preferred embodiment of a drill adapter for use with the mounting system of the subject invention.

FIG. 14 is side elevational view of a preferred embodiment a saw blade for use with the mounting system of the subject invention.

DETAILED DESCRIPTION OF THE INVENTION

The invention involves a two-piece mounting system for a trail camera. Each piece is placed by an extension pole so the mount can be placed high into a tree. A support attaches to the tree. A utility bar connects to the support through a releaseable capture means and holds a universal camera mount on a swivel with an adjustment bar.

The support of the two-piece mounting system of the subject invention has a fitting that corresponds to a fitting on the utility bar and the extension pole. This allows some embodiments of the support to be placed remotely using the extension pole. The fittings allow the utility bar to be placed on the support and manipulated remotely by the extension pole in all embodiments of the subject mounting system.

Figure 1:
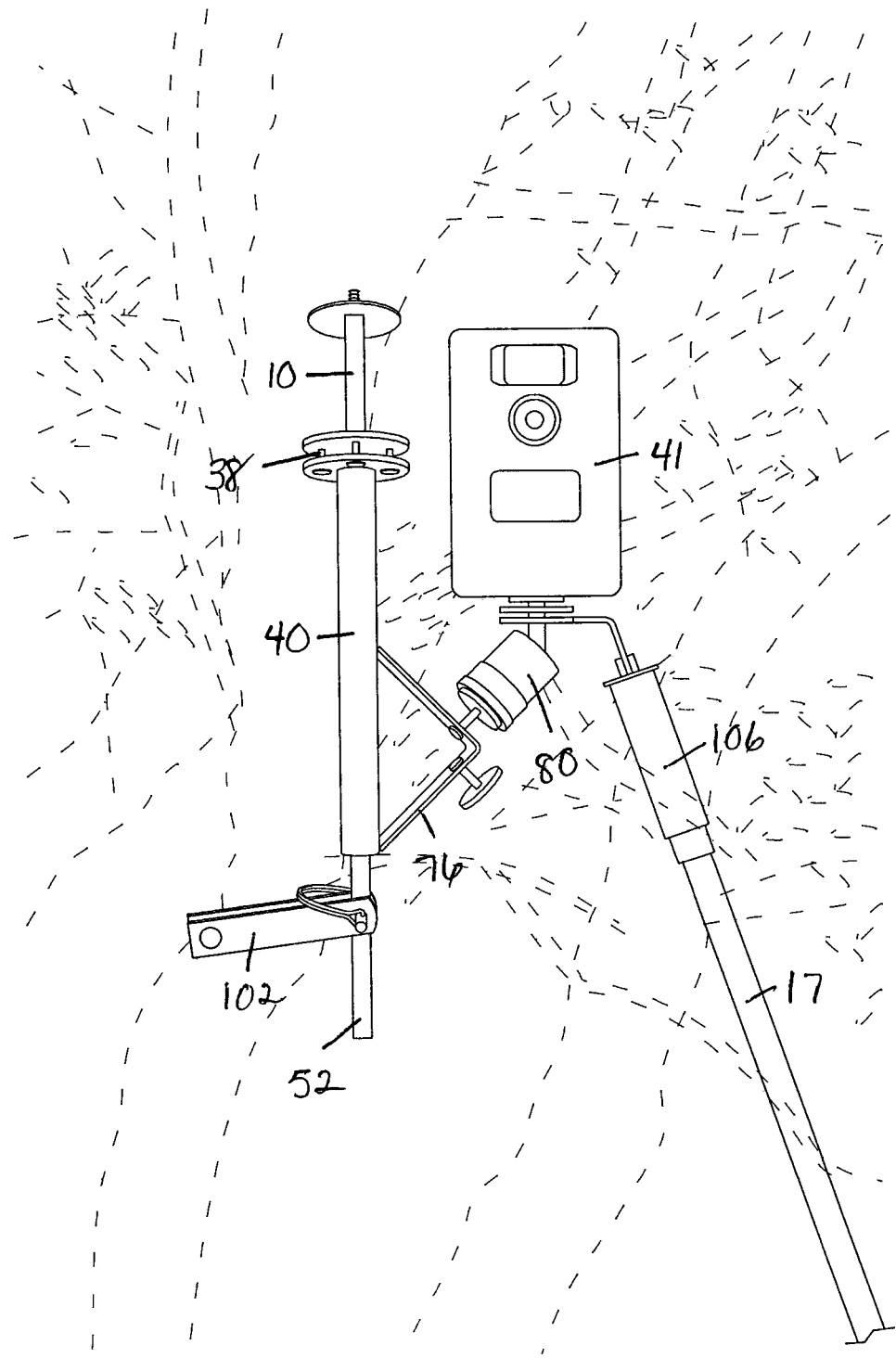
FIG. 1 is an environmental view of a preferred embodiment of the mounting system of the subject invention.
Figure 8:
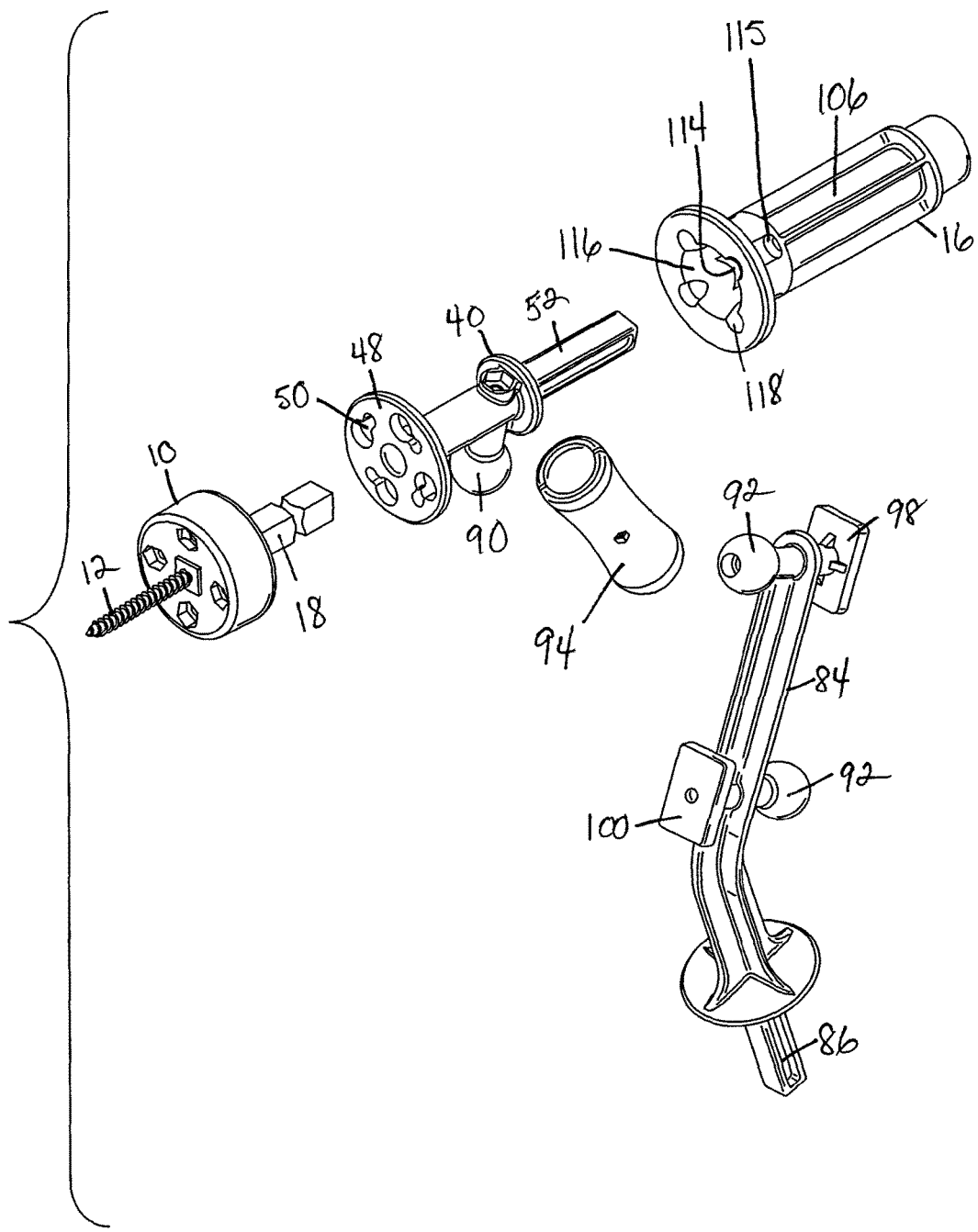
FIG. 8 is a front isometric partial exploded view of another preferred embodiment of the mounting system of the subject invention.
Figure 9:
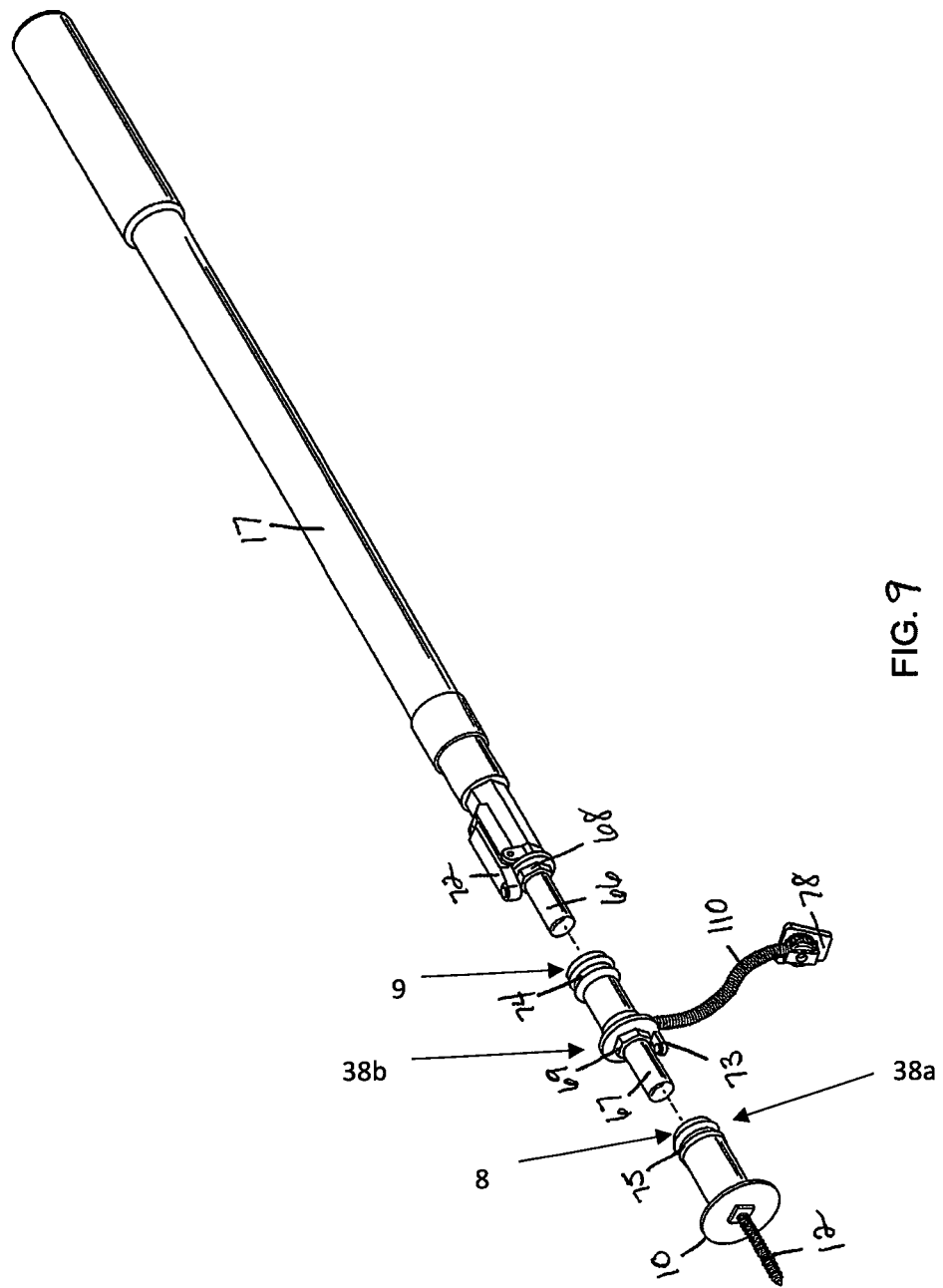
FIG. 9 is a front isometric exploded view of another preferred embodiment of the mounting system of the subject invention.
Figure 11:
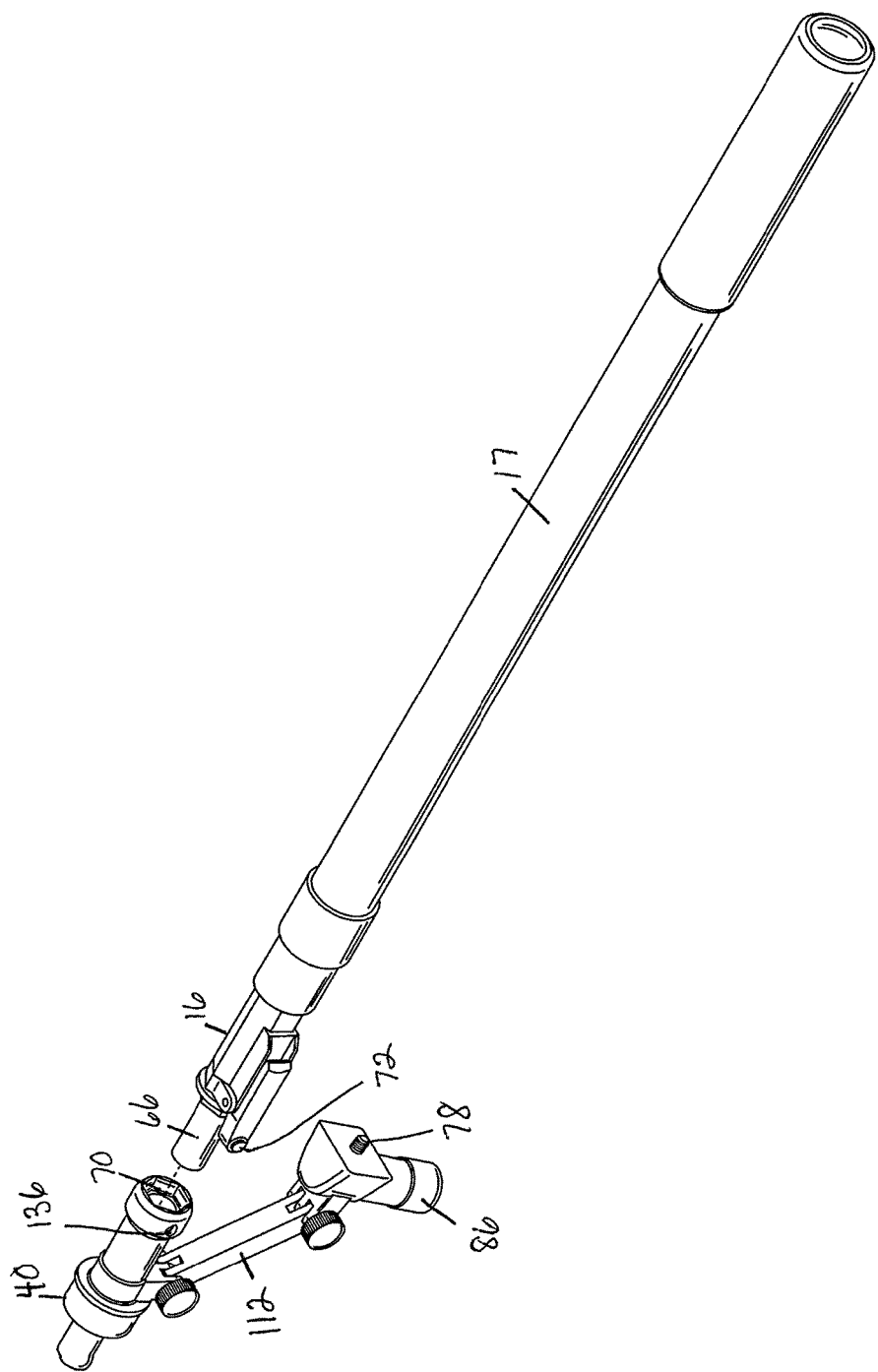
FIG. 11 is a rear isometric partially exploded view of another preferred embodiment of the mounting system of the subject invention.

The support 10 has an anchoring means to attach the support to a surface. In a preferred embodiment the anchoring means is an auger 12 that bores into a branch attaching the support to a tree. A support fitting 14 is on one end of the support opposite the auger. The support fitting 14 corresponds to a pole fitting 16 on the extension pole 17 which is used to drive the auger into the tree. The corresponding fittings can be any shape or configuration, it is only necessary that they possess the strength and stability to manipulate the mounting system pieces remotely. In an exemplified embodiment, the support fitting on the auger is a square tubular rod 18. The support fitting is inserted into a square companion fitting 114 of the extension pole fitting 16 (FIG. 8). The square shape allows the extension rod connected to the auger through the fitting to be twisted to drive the auger into the tree. In the embodiment shown in FIG. 8, the pole fitting 114 is created by an adapter 106 added to the end of the pole. The square companion fitting 114 receives the square rod 18 while a cup 116 near the top of the adapter 106 has divots 118 to accept the flattened heads of pins of the releaseable attachment means described below. A spring tension ball 115 holds the square tubular rod 18 in the adapter 106 until sufficient downward force is applied to pull the fittings apart. The pole fitting 16 need not however be created by an adapter and can be a part of the pole (FIGS. 9 and 11). In the embodiment shown in FIGS. 1 and 2, the material, powder coated steel, and length of the fitting contribute to the needed strength of the fitting in this embodiment. Fittings can also be made of plastic or composite. It would be apparent to one skilled in the art how to choose the proper configuration and materials for a fitting that possesses the necessary qualities to allow manipulation of system pieces by the extension pole. FIG. 13 shows a drill adapter 120 to assist in driving the pieces of the subject invention. The drill adapter has a shank 122 and a drill adapter fitting 124 like the pole fitting 16. One skilled in the art would likewise understand that anticipating using a power drill with the subject system may require adjustment in the choice of material used for system components as well as choosing the size and shape of the fitting. The drill adapter shown in the exemplified embodiment hooks to the extension pole fitting allowing the drill to be used when placing the support remotely.

Figure 12:
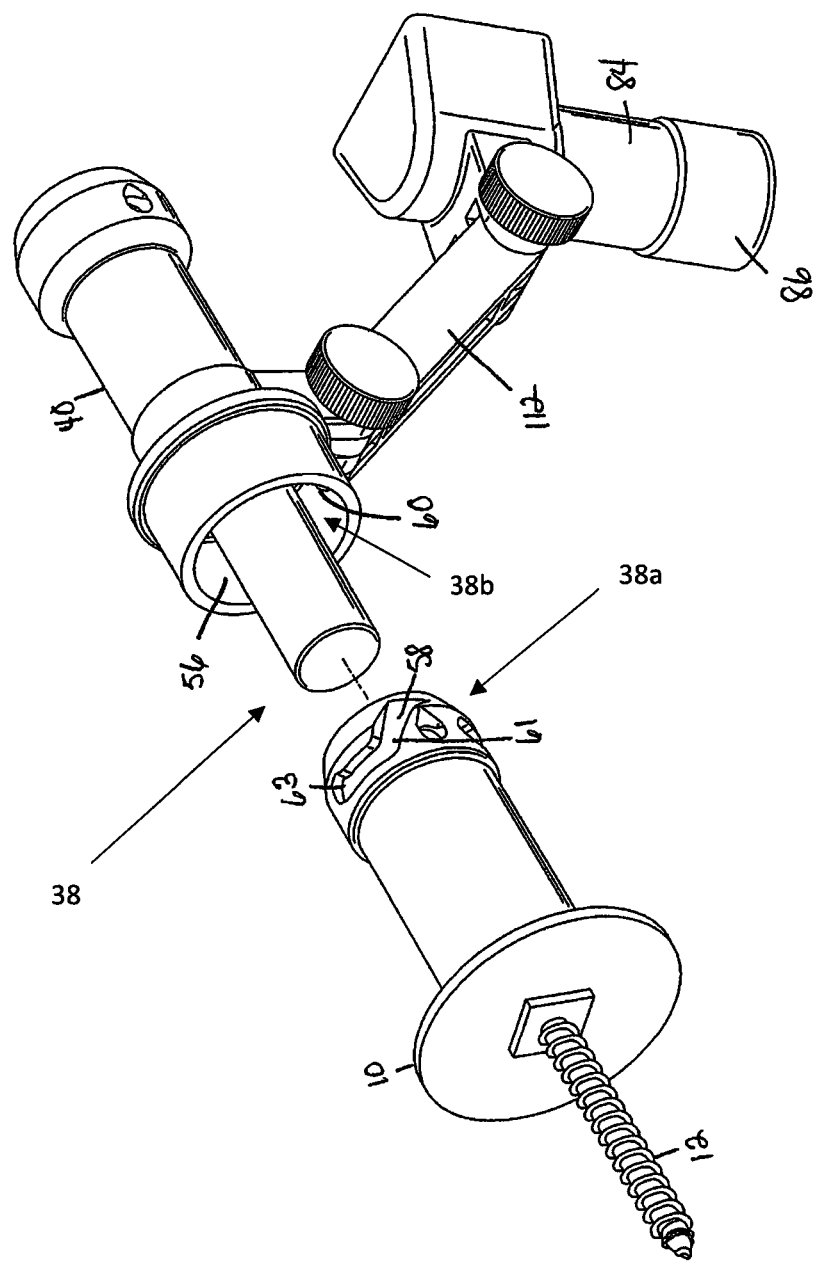
FIG. 12 is a front isometric exploded view of the support and utility bar connection of the mounting system shown in FIG. 11.

Pieces of the subject mounting system can be made of not only steel, but aluminum, plastics, or composites. The fittings can include adapters 106 made to convert available extension poles for use with the subject invention (FIG. 8) or the fittings on system pieces can be configured to complement the fittings on available poles (FIG. 12). Additionally, connecters can be used to connect two extension poles together allowing the subject system to be mounted higher in a tree.

Figure 4:
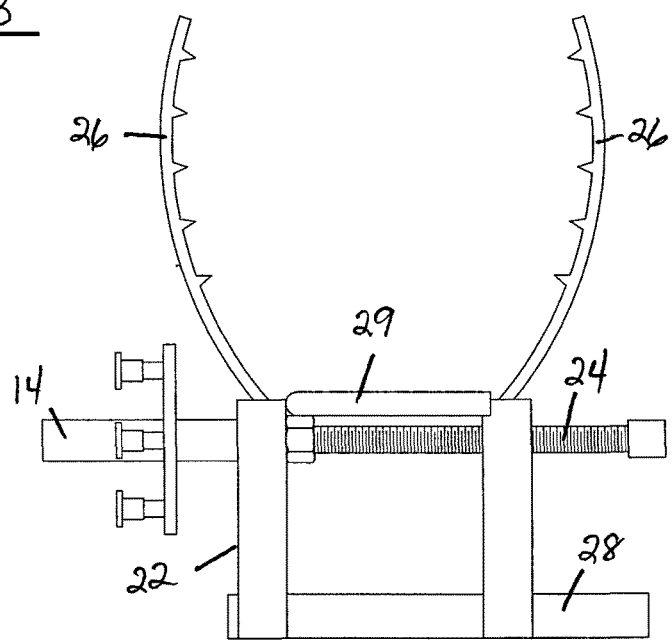
FIG. 4 is side elevational view of a preferred embodiment of a support of the mounting system of the subject invention.

In another preferred embodiment, a clamp 22 can be used as the anchoring means of the support of the two-piece mounting system of the subject invention (FIG. 4). The support fitting 14 is rigidly connected to a threaded bolt 24 that pulls the jaws 26 of the clamp together as the fitting is turned by the extension pole. Bar 28 keeps the jaws of the clamp in alignment as they are being drawn together. A stabilizing rod 29 captures the branch and prevents the clamp from spinning about the branch as the jaws are being tightened. Using the jaws to mount the system prevents the need to bore a deep, potentially damaging, and destabilizing hole into the tree branch.

Figure 3:
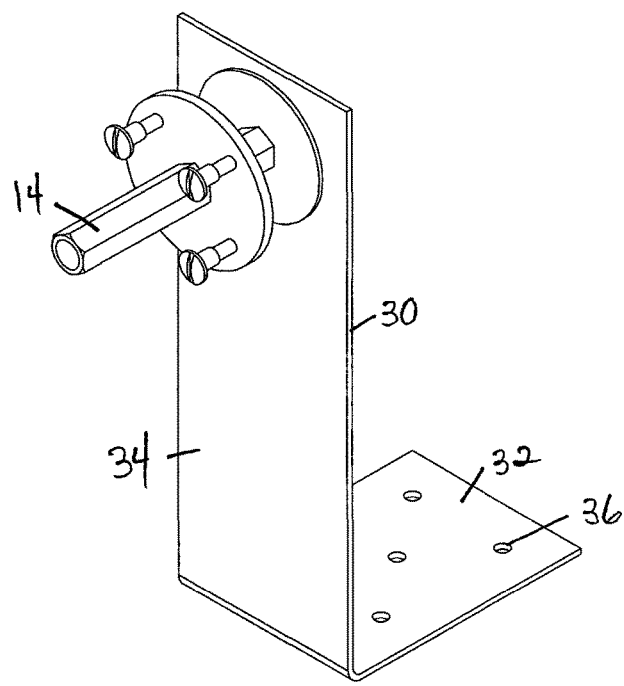
FIG. 3 is a rear isometric view of another preferred embodiment of a support of the mounting system of the subject invention.

Another preferred embodiment of the support for the two-piece mounting system of the subject invention is shown in FIG. 3. In this embodiment, the support includes a mounting plate 30. The plate has a support fitting 14 affixed to the plate to which the utility bar is mounted. In the exemplified embodiment, the plate has a back 32 used to attach the plate to the structure and a platform 34. The back has holes 36 so that the plate can be mounted to a vertical structure such as a building. In this embodiment, one must climb a ladder to position the plate. After the plate is attached to the building however the camera can be placed, positioned, and maintained from the ground using the extension pole.

Figure 7:
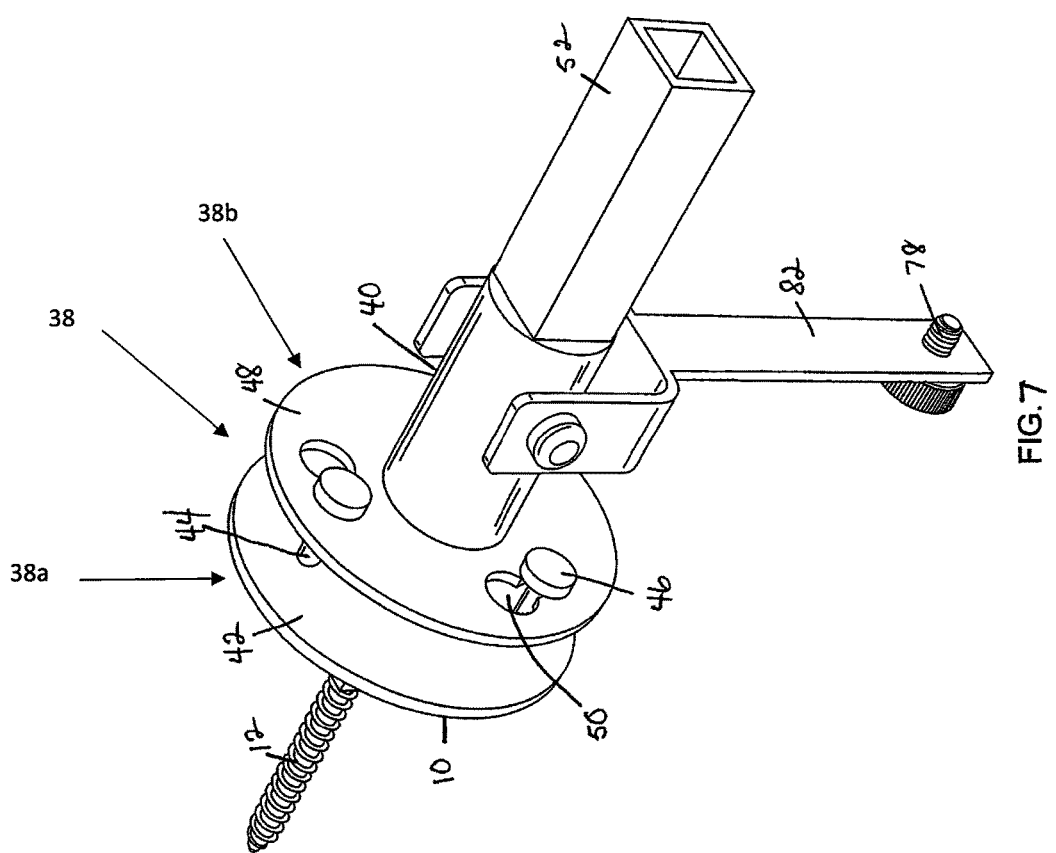
FIG. 7 is a rear isometric view of a preferred embodiment of a utility bracket of the mounting system of the subject invention.

The support also contains part of the releasable capture means 38 that connects the support 10 to the utility bar 40. An advantage of the two-piece system of the subject invention is that the utility bar can be released from the support. Therefore, anything attached to the utility bar, for example, a trail camera 41, can be brought down to check its condition or change its battery without having to remove the entire system from the tree. The support releasable capture means 38a captures and holds the complementary utility bar releasable capture means 38b during installation and of the system and is releasable for uninstallation of the system. In one exemplified embodiment, the releasable capture means 38 is a simple spring-loaded twist-to-lock system. The support releasable capture means 38a is comprised of a support plate 42, which has pins 44 with flattened heads 46, for example, screw heads, protruding from the support plate 42 toward the corresponding fitting of the utility bar 40, which comprises the utility bar releasable capture means 38b. (FIG. 7). In this embodiment, the utility bar releasable capture means 38b is comprised of a utility bar plate 48, which has openings 50 to receive the flattened heads 46 that taper (FIG. 8) as the heads move within the openings 50 to hold the flattened heads 46 to the utility bar plate 48 once received. A spring (not shown) provides the pressure to hold the flattened heads 46 in place and to connect the utility bar 40 to the support 10. In the exemplified embodiment, the support plate 42 has protruding pins with flattened heads 46 and is located on the support 10 while the utility bar plate with the openings 50 is located on the utility bar 40. It should be apparent however that this embodiment of the releasable capture means 38 would work equally as well if the position of each piece was reversed. This situation is likewise applicable for any of the releasable capture means discussed. In the present exemplified embodiment of the utility bar 40, the end opposite of the utility bar plate 48 has a utility bar fitting 52 that receives the extension pole fitting 16, the pole turns the utility bar 40 to capture the flattened heads 46 in the tapered ends of the openings 50. A preferred embodiment of the tapered openings 50 of this embodiment has a recessed shoulder so that the screw heads locked in the opening will be flush with the surface of the plate.

Figure 5:
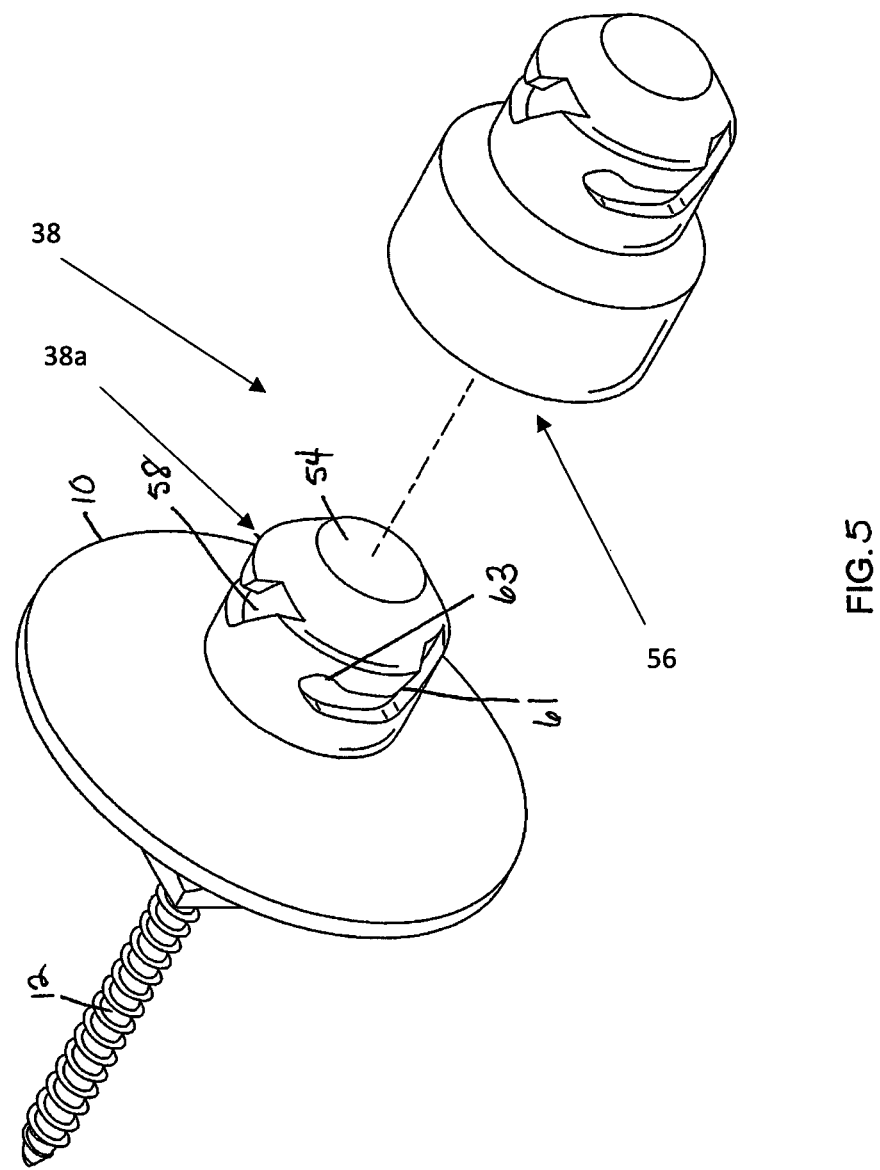
FIG. 5 is a rear isometric view of another preferred embodiment of a support of the mounting system of the subject invention.

FIGS. 5 and 12 show another preferred embodiment of a releasable capture means 38 of the mounting system of the subject invention. In this embodiment the releasable capture means 38 is a bayonet-type connection where the support releasable capture means 38a is comprised of a stub 54, which accepts a corresponding socket 56, which comprise the utility bar releasable capture means 38b. The stub 54 has grooves 58 that engage knobs 60 in the socket 56 (FIG. 12). The knobs 60 move along the grooves 58 as the stub 54 is twisted in the socket 56. In the exemplified embodiment, the grooves have an incline 61 that draws the stub 54 into the socket 56 as it is twisted. The grooves terminate in a recess 63 as the grooves turn slightly back toward the entry of the grooves to lock the knobs 60 in the terminus of the grooves 58. The stub or socket can also be spring-loaded to assist in securing the stub within the socket. In this preferred embodiment, the stub 54 is located on the support 10 and accepts the corresponding socket 56, located on the utility bar 40. It should be apparent however that this embodiment of the releasable capture means 38 would work equally as well if the position of each piece was reversed.

Figure 6:
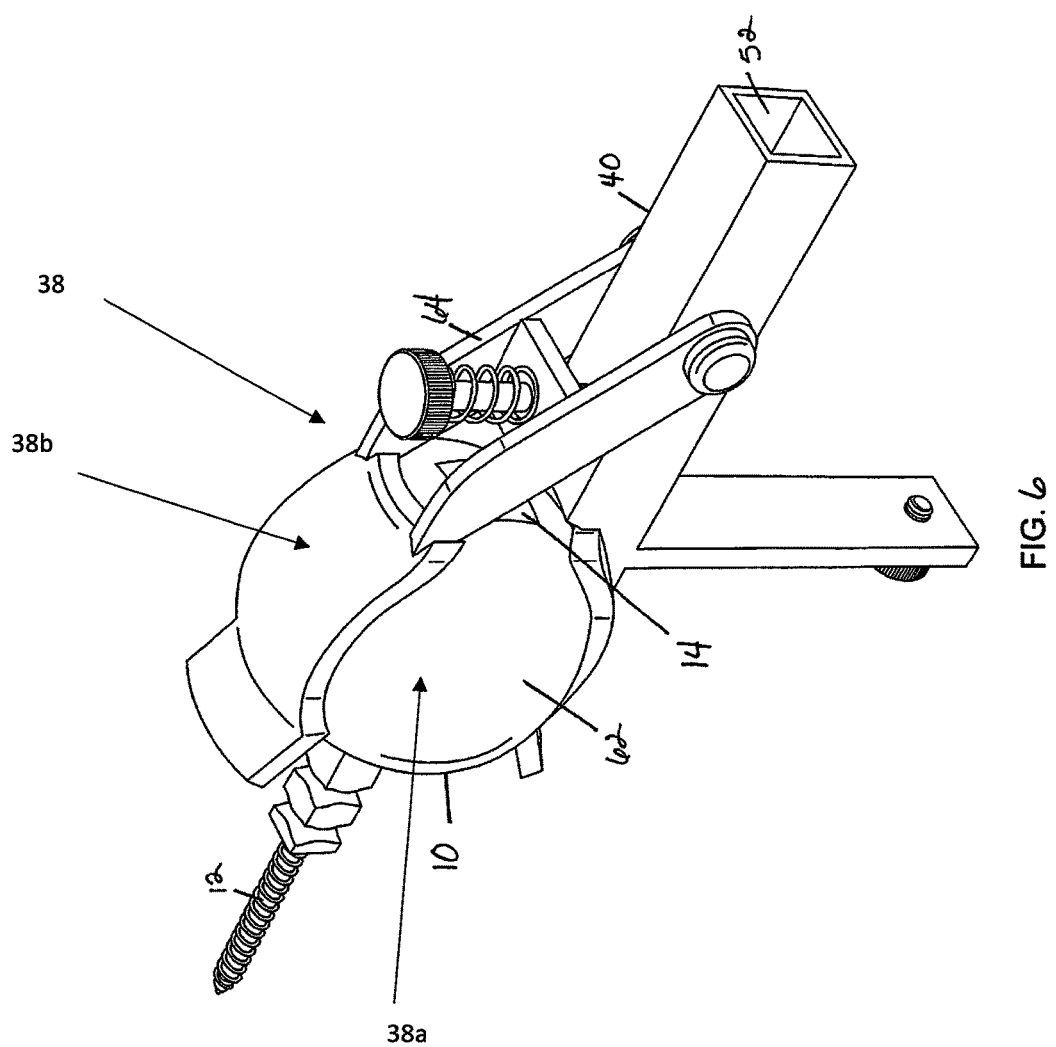
FIG. 6 is a rear isometric view of a preferred embodiment of a releasable capture means of the mounting system of the subject invention.

Another preferred embodiment of the releasable capture means 38 used to connect the support 10 to the utility bar 40 of the mounting system of the subject invention is shown in FIG. 6. In this embodiment, the utility bar releasable capture means 38b is comprised of a spring-loaded clamp 64, which captures and holds a ball 62. The ball 62 comprises the support releasable capture means 38a. In FIG. 6 the ball 62 is connected to the support 10 and receives the clamp, which is connected to the utility bar. It would be apparent to one skilled in the art however that the means would work equally as well if the ball were on the utility bar and the clamp was on the support. It is also noted that in FIG. 6 the support fitting 14, and utility bar fitting 52 receive a square rod, the converse of FIG. 2, further illustrating that the positioning of the parts of the releasable capture means as well as the parts of the complementary fittings can be reversed and still function within the subject mounting system.

Figure 10:
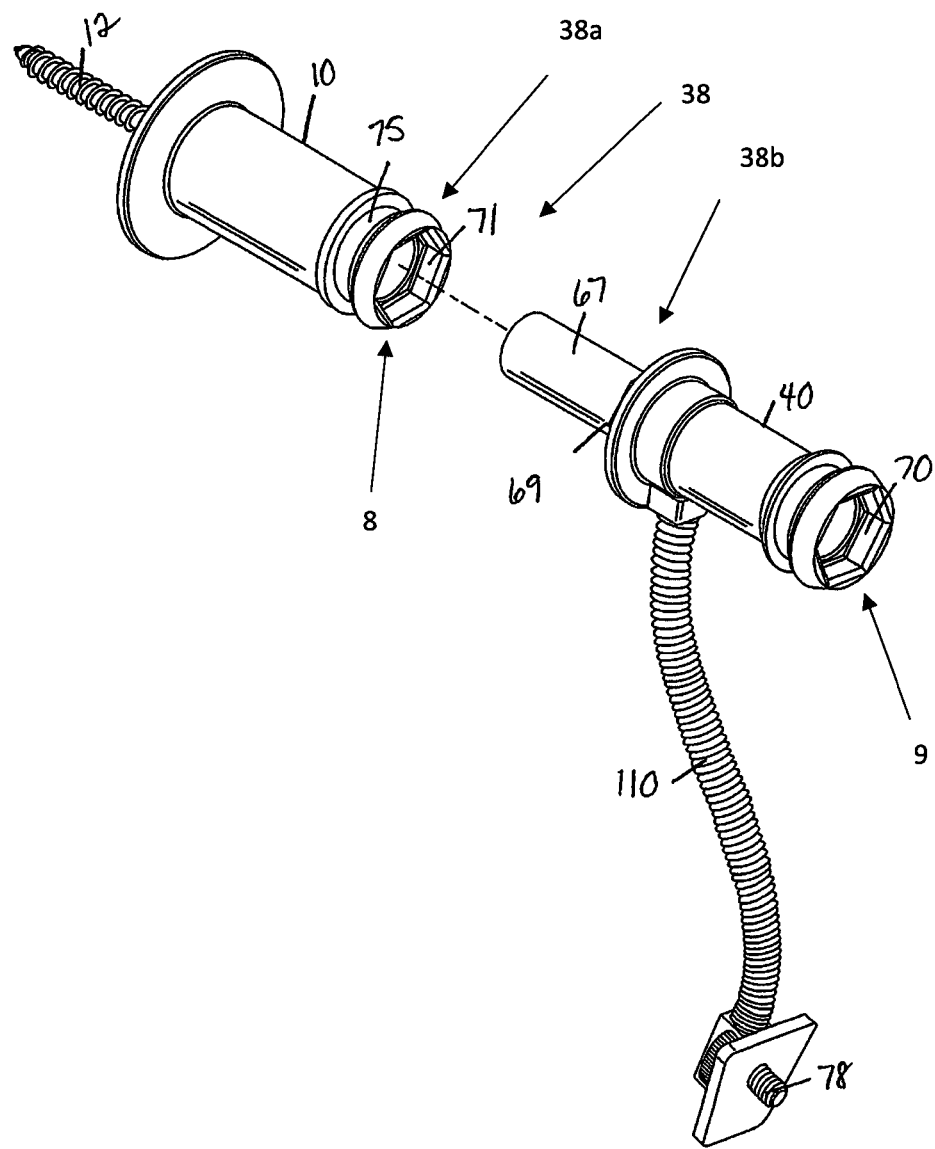
FIG. 10 is a rear isometric partial exploded view of the support and utility bar connection of the preferred embodiment shown in FIG. 9.

FIGS. 9 and 10 show another preferred embodiment of the releasable capture means 38 of the subject mounting system. In this embodiment, the means mimics the fitting configuration of an available extension pole 17 shown in FIGS. 9 and 11. The distal end of the extension pole 17 has a post 66 with a hexagonal neck 68 at its base. The post 66 is received by the complementary support fitting 8 and utility bar fitting 9, the neck 68 dropping into a support hexagonal recess 71, and utility bar hexagonal recess 70 in that fitting. A snap button 72 engages a utility bar collar 74 to hold the utility bar fitting 9 together. Likewise, the releasable capture means 38 connecting the utility bar 40 to the support 10 (shown in FIGS. 9 and 10) includes a utility bar post 67 with a hexagonal neck 69 which drops into a complementary support fitting 8 with a hexagonal recess 71. A snap button 73 engages a collar 75 to hold the releasable capture means 38 together. The support releasable capture means 38a is comprised of support fitting 8 with a hexagonal recess 71, and a collar 75. The utility bar releasable capture means 38b is comprised of a utility bar post 67 with a hexagonal neck 69, and a snap button 73, which engages the collar 75 of the support releasable capture means 38a. It may be necessary for the snap buttons 72, 73 to yield under different pressure since the snap button on the extension pole 17 is used to place the mounting system pieces and then be removed while the configuration used as a releasable capture means 38 connecting the utility bar 40 to the support 10 must maintain its connection after the pole is removed. Differing the pressure or yield angles on the collar are used to customize the release of the various snap buttons.

One skilled in the art would understand that a number of releasable capture means could be used on the subject invention. In an alternative embodiment, a releasable capture means includes a lever pivotally connected through a wall of the auger. The lever engages the spring loaded fitting as it enters the end of the auger. To release the connection, a tab on the lever is pulled or pushed and the pieces are separated.

The utility bar 40 connects to the support 10 by releasable capture means 38. The utility bar 40 can have a fitting at one end configured to engage the complementary fitting end of the support 10. The fitting end of the support 10 also contains part of the releasable capture means 38. A fitting to engage the extension pole 17 is disposed at the other end of the utility bar.

Figure 2:
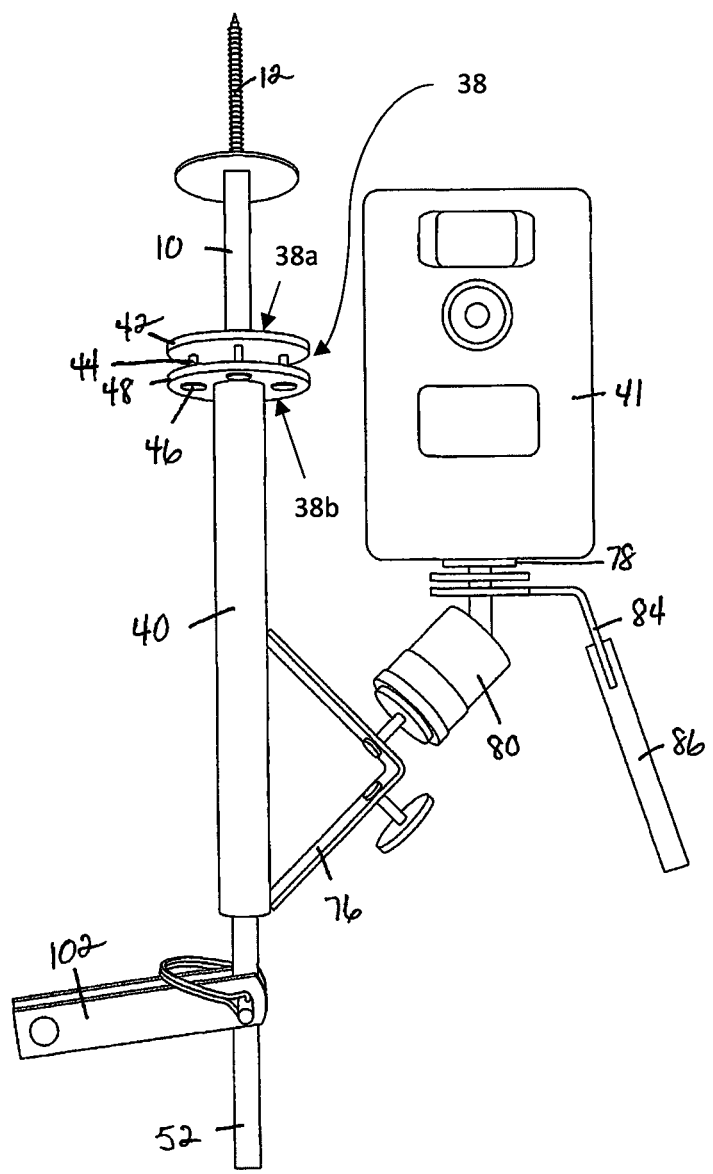
FIG. 2 is a side elevational view of the preferred embodiment shown in FIG. 1.

The utility bar 40 is used to mount accessories to the subject system. In FIG. 2 a bracket 76 positioned along the utility bar to which an accessory can be mounted. The system is used primarily as a trail camera mounting system that allows the user to mount a trail camera 41 high above the trail so it will not interfere or be detected by wildlife and also so it is out of the reach of thieves. One skilled in the art would realize that there are a number of camera mounts that can be used with the subject system. A preferred camera mounting system includes a universal camera mount 78 atop a swivel 80. The swivel allows the camera's angle to be adjusted so that the camera can capture movement from any set angle. Another embodiment that provides movement to the camera mount 78 is the U-bracket 82 shown in FIG. 7. An adjustment bar 84 on the camera mount allows the camera to be positioned after it is in the tree. The adjustment bar 84 has an adjustment bar fitting 86 that corresponds to the pole fitting 16. Once positioned in the tree, the extension pole can be used to aim the camera where desired. To further assist in aiming the camera, a laser or other aiming device can be mounted on or near the camera and the laser can be used to determine the position of the camera's focus. The aiming device can be associated with mounting system pieces, for example the extension pole. Alternatively, the laser can clip to the camera or a clip can be provided to receive the laser.

FIG. 8 shows a sphere 90 mounted on the utility bar 40. The sphere can be used with and received by a variety of camera mounts to allow full adjustability and positioning of the camera. While an adjustment bar with a universal camera mount could be mounted directly to the ball, the hook-up 94 shown in FIG. 8 can be used to connect the adjustment bar 84 to the utility bar to provide a stout mount that can be fully manipulated. The hook-up 94 receives the sphere 90 on the utility bar and a sphere 92 on the adjustment bar. This configuration provides full movement of a camera mounted on the device as device pieces move about the spheres. The adjustment bar in this embodiment is configured to support a camera with either a bottom camera mount or a back camera mount (FIG. 8). The adjustment bar 84 platforms 98, 100 on the top of the bar and on the bottom of the bar, respectively, to receive and support universal camera mounts including camera quick shoes. Other adjustable interfaces by which the camera can be mounted to the utility bar that provide full camera positioning include, but are not limited to, a flex arm 110 (FIG. 10) and an arm with meshed hinge compression style connections 112 (FIG. 12).

It is noted that although the subject mounting system is described for mounting a trail camera, the system can be used to mount other items. For example, flood lights can be mounted to the utility bar to illuminate an outdoor work area. Motion sensing lights can be mounted to illuminate a campsite and make late night relief trips into the bushes less dangerous. A rail 102 inserted into an aperture in the utility bar can support a block and tackle to allow the system to be used to hoist a load off the ground. The hoist does not interfere with the utility bar and thus the hoist can be used while a camera or light is in place.

Figure 15:
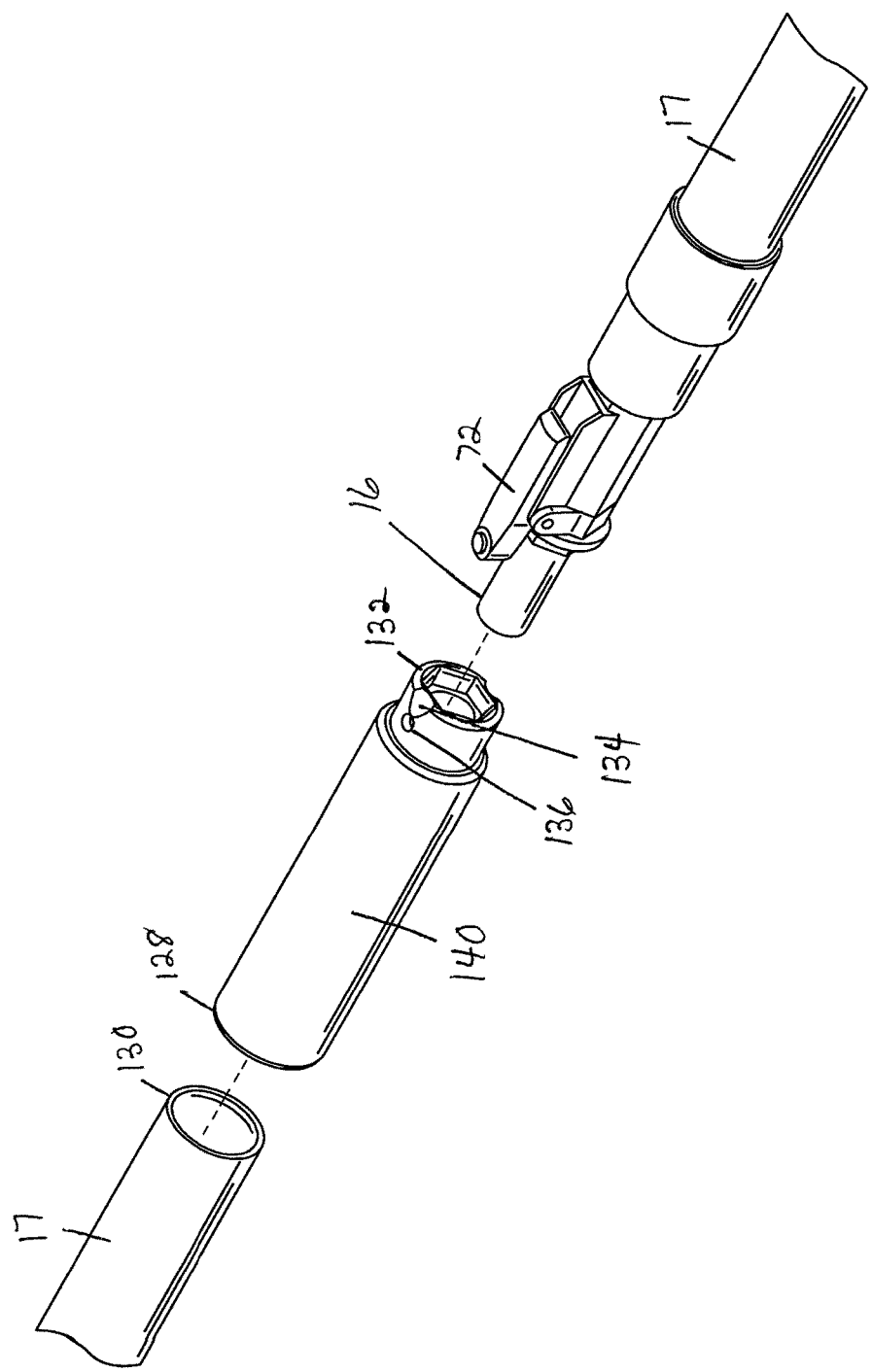
FIG. 15 is a rear isometric view of a preferred embodiment of an connector to connect two extension poles to one another.

In the exemplified embodiments, the extension pole 17 is one piece. It is noted however that the pole can telescope to reach and place the mounting system higher. Further, several poles can be connected together to create a longer pole. The telescoping connection and the pole need only be rigid enough to manipulate the pieces when assembling the system. FIG. 15 shows a preferred embodiment of a connector 140 that can be used to join two extension poles to one another. One end of the connector 128 is affixed to an end of one extension pole 130 opposite the pole fitting. The connector fitting end 132 of the connector engages the extension pole fitting 16 of a second extension pole. It is noted that in this embodiment the fitting that complements the fitting on the extension pole has a ramp 134 entering a pit 136 that is engaged by the snap button 72 on the extension pole 17 unlike the embodiment shown in FIG. 9 where the snap button 72 engages a collar 74. FIG. 11 shows an alternative embodiment in which the snap button 72 engages a pit 136.

To mount the subject system a tree or tree part of suitable strength is chosen to support the system. A knife or saw 108 can be adapted to the fitting in the extension pole to allow the user to clear brush and prepare the area to mount the system (FIG. 14). The support, with an auger anchoring means, for example, is then inserted into the extension pole. The auger is raised to the branch with the extension pole and driven into the branch by turning the extension pole. Once the auger is seated in the branch, the extension pole is removed. Any desired accessory is attached to the utility bar. The utility bar is inserted into the extension pole. The utility bar is connected to the auger by the releasable capture means. The extension pole is removed. At any time, the utility bar and its attached accessory can be removed for maintenance and replaced. To remove the system, the extension pole is raised to engage the fitting end of the utility bar and the utility bar is released from the auger by disconnecting the capture means and lowering it from the tree. The extension pole is then used to loosen the auger from the tree.

The two-piece mounting system of the subject invention safely installs a trail camera high in a tree. This not only protects the camera from damage and theft, but prevents the person installing the camera from dangerously climbing up and down the tree or balancing preciously on a ladder on unstable ground. The system is versatile and can be configured to support not only cameras, but lights or other accessories. It also can be used to hoist a load into the tree on which it is mounted.

It is understood that the foregoing examples are merely illustrative of the present invention. Certain modifications of the articles and/or methods may be made and still achieve the objectives of the invention. Such modifications are contemplated as within the scope of the claimed invention.

The invention claimed is:

1. A mounting system comprising:
a support, the support comprising an anchoring means, which attaches the support to a surface, a support fitting, and a support releaseable capture means;
a utility bar, the utility bar comprising a utility bar fitting, a utility bar releaseable capture means, wherein the utility bar releaseable capture means are configured to engage and releaseably capture the support releaseable capture means;
a pole, the pole comprising a pole fitting configured to complement the support fitting and the utility bar fitting, where said pole fitting engages the utility bar fitting to place the utility bar by connecting the utility bar releasable capture means to the support releasable capture means; whereby said pole fitting releases and is removed from said utility bar fitting while the connection between said utility bar releasable capture means and said support releasable capture means is maintained.

2. The mounting system of claim 1, wherein said anchoring means is an auger.

3. The mounting system of claim 2, wherein said pole fitting engages said support fitting to drive said auger of said support into said surface.

4. The mounting system of claim 1, wherein said anchoring means is a clamp, the clamp comprising:
a pair of jaws, the jaws configured to be moved relative to one another to capture said surface, the jaws moved by said pole when said pole fitting is engaged to said support fitting and said pole is manipulated; and
a brace to engage said surface as the jaws are being moved.

5. The mounting system of claim 1, wherein said anchoring means is a mounting plate.

6. The mounting system of claim 1, wherein said support releaseable capture means is selected from the group consisting of a a first plate comprising at least two pins protruding from said first plate, and a second plate with at least two openings configured to capture and hold said at least two pins.

7. The mounting system of claim 6, wherein said pins comprise pan heads and said openings taper to capture and hold the pan head of said pins.

8. The mounting system of claim 6, wherein said support releaseable capture means further comprises a spring.

9. The mounting system of claim 1, wherein said utility bar releaseable capture means is selected from the group consisting of a first plate comprising at least two pins protruding from said first plate, and a second plate with at least two openings configured to capture and hold said at least two pins.

10. The mounting system of claim 9, wherein said pins comprise pan heads and said openings taper to capture and hold the pan head of said pins.

11. The mounting system of claim 7, wherein said utility bar releaseable capture means further comprises a spring.

12. The mounting system of claim 1, wherein said support releaseable capture means is a ball and said utility bar releaseable capture means is a spring loaded clamp capable of engaging the ball.

13. The mounting system of claim 1, wherein said support releaseable capture means comprises a lever pivotally connected through a wall of said support releaseable capture means and said utility bar releaseable capture means comprises a spring loaded step that engages the lever, wherein said step is released from said lever when the lever is pivoted.

14. The mounting system of claim 1, wherein said support releaseable capture means is selected from the group consisting of knobs protruding from a shaft, and grooves configured to engage the knobs and guide the knobs as they are moved along the grooves into a locked position.

15. The mounting system of claim 1, wherein said utility bar releaseable capture means is selected from the group consisting of knobs protruding from a shaft, and grooves configured to engage the knobs and guide the knobs as they are moved along the grooves into a locked position.

16. The mounting system of claim 1, wherein said support releaseable capture means is selected from the group consisting of a neck, and a recess configured to receive the neck, the neck held within the recess by a spring snap arm engaging a collar of the recess.

17. The mounting system of claim 1, wherein said utility bar releaseable capture means is selected from the group consisting of a neck, and a recess configured to receive the neck, the neck held within the recess by a spring snap arm engaging a collar of the recess.

18. The mounting system of claim 1, further comprising a camera mount.

19. The mounting system of claim 1, further comprising an adjustment bar, the adjustment bar comprising an adjustment bar fitting, said pole fitting configured to complement said adjustment bar fitting, said support fitting, and said utility bar fitting.

20. The mounting system of claim 19, wherein said adjustment bar further comprises a camera mount.

21. The mounting system of claim 19, wherein said adjustment bar is pivotally mounted to said utility bar by a U shaped bracket.

22. The mounting system of claim 1, wherein said utility bar further comprises a bracket, the bracket comprising a camera mount.

23. The mounting system of claim 1, wherein said utility bar further comprises a hole to receive a block and tackle.

24. The mounting system of claim 1, wherein said pole further comprises a fitting opposite the pole fitting to receive a drill to move the pole.

* * * * *